United States Patent
Moore et al.

(10) Patent No.: US 7,731,272 B2
(45) Date of Patent: Jun. 8, 2010

(54) A-PILLAR FORCE TRANSFER STRUCTURE

(75) Inventors: Jaime N. Moore, Canton, MI (US); Tomoki Matsuzawa, Aichi (JP); Stuart W. Bailey, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 290 days.

(21) Appl. No.: 11/964,128

(22) Filed: Dec. 26, 2007

(65) Prior Publication Data

US 2009/0167056 A1 Jul. 2, 2009

(51) Int. Cl.
*B62D 25/04* (2006.01)

(52) U.S. Cl. .............................. 296/187.09; 296/193.06

(58) Field of Classification Search .................... 296/30, 296/187.09, 187.1, 187.12, 193.06, 203.03
See application file for complete search history.

(56) References Cited

U.S. PATENT DOCUMENTS

| | | | |
|---|---|---|---|
| 3,944,278 A | | 3/1976 | Takahashi et al. |
| 4,188,059 A | * | 2/1980 | Bauer et al. ............. 296/203.02 |
| 4,294,487 A | * | 10/1981 | Nakamura ............. 296/203.03 |
| 4,470,619 A | * | 9/1984 | Imajyo et al. ............... 280/808 |
| 4,573,734 A | * | 3/1986 | Gass ..................... 296/187.09 |
| 5,042,872 A | * | 8/1991 | Yoshii ................... 296/203.02 |
| 5,246,264 A | * | 9/1993 | Yoshii ................... 296/203.03 |
| 5,564,744 A | | 10/1996 | Frost |
| 5,586,799 A | * | 12/1996 | Kanemitsu et al. ...... 296/203.02 |
| 5,653,495 A | | 8/1997 | Bovellan et al. |
| 5,740,993 A | | 4/1998 | Siepe-Noll |
| 5,810,428 A | * | 9/1998 | Maki ..................... 296/203.02 |
| 5,826,907 A | | 10/1998 | Saito et al. |
| 5,833,303 A | | 11/1998 | Kawai et al. |
| 5,941,597 A | * | 8/1999 | Horiuchi et al. ......... 296/203.01 |
| 6,053,564 A | * | 4/2000 | Kamata et al. .......... 296/187.09 |
| 6,129,410 A | * | 10/2000 | Kosaraju et al. ........ 296/187.12 |
| 6,209,950 B1 | * | 4/2001 | Hanyu .................... 296/203.02 |
| 6,250,710 B1 | * | 6/2001 | Matsuzaki .............. 296/203.02 |
| 6,267,437 B1 | | 7/2001 | Morsch et al. |
| 6,293,617 B1 | * | 9/2001 | Sukegawa ............... 296/203.03 |
| 6,322,134 B1 | * | 11/2001 | Yang ...................... 296/203.02 |
| 6,340,203 B2 | | 1/2002 | Enomoto et al. |
| 6,390,538 B1 | | 5/2002 | Hashimoto et al. |
| 6,419,305 B1 | | 7/2002 | Larsen |
| 6,447,052 B2 | * | 9/2002 | Saeki ..................... 296/187.09 |
| 6,450,565 B2 | * | 9/2002 | Yamamoto ............. 296/187.09 |

(Continued)

FOREIGN PATENT DOCUMENTS

JP 11235983 A * 8/1999

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A load transfer structure in an A-pillar assembly for transferring force from a frontal impact to the vehicle rail, rocker and door reinforcement. The load transfer structure having a support wall, a pair of transverse walls, and a longitudinal wall and is disposed in a space within the A-pillar assembly. Accordingly, the load transfer structure reduces material required in conventional A-pillar assemblies while maintaining the same load transfer capabilities.

6 Claims, 4 Drawing Sheets

U.S. PATENT DOCUMENTS

| | | | |
|---|---|---|---|
| 6,474,726 B1 * | 11/2002 | Hanakawa et al. | 296/191 |
| 6,488,312 B2 | 12/2002 | Knoethig et al. | |
| 6,517,144 B2 | 2/2003 | Kobayashi | |
| 6,572,181 B2 | 6/2003 | Jonsson | |
| 6,648,404 B2 * | 11/2003 | Yakata et al. | 296/209 |
| 6,679,547 B2 | 1/2004 | Ju-Sik | |
| 6,698,823 B2 * | 3/2004 | Kim | 296/203.03 |
| 6,702,368 B1 | 3/2004 | Hanyu | |
| 7,021,700 B2 * | 4/2006 | Yoshida | 296/187.05 |
| 7,083,224 B2 * | 8/2006 | Yamamura et al. | 296/198 |
| 7,152,914 B2 * | 12/2006 | Dingman et al. | 296/193.05 |
| 7,267,394 B1 * | 9/2007 | Mouch et al. | 296/203.02 |
| 7,407,220 B2 * | 8/2008 | Kanagawa et al. | 296/187.09 |
| 7,445,269 B2 * | 11/2008 | Yustick et al. | 296/187.01 |
| 7,510,234 B2 * | 3/2009 | Ameloot et al. | 296/187.12 |
| 7,533,925 B2 * | 5/2009 | Klatt et al. | 296/146.6 |
| 7,631,918 B2 * | 12/2009 | Yasukouchi et al. | 296/30 |
| 2003/0102695 A1 * | 6/2003 | Kim | 296/203.03 |
| 2007/0080563 A1 * | 4/2007 | Eipper et al. | 296/193.06 |
| 2007/0278828 A1 * | 12/2007 | Anders et al. | 296/193.06 |
| 2008/0265623 A1 * | 10/2008 | Kiyotake et al. | 296/187.09 |

FOREIGN PATENT DOCUMENTS

| | | |
|---|---|---|
| JP | 2003205856 | 7/2003 |
| JP | 2003205856 A * | 7/2003 |
| JP | 2006297987 | 11/2006 |
| JP | 2006297987 A * | 11/2006 |
| WO | WO 2005/061309 | 7/2005 |
| WO | WO 2005061309 A1 * | 7/2005 |

* cited by examiner

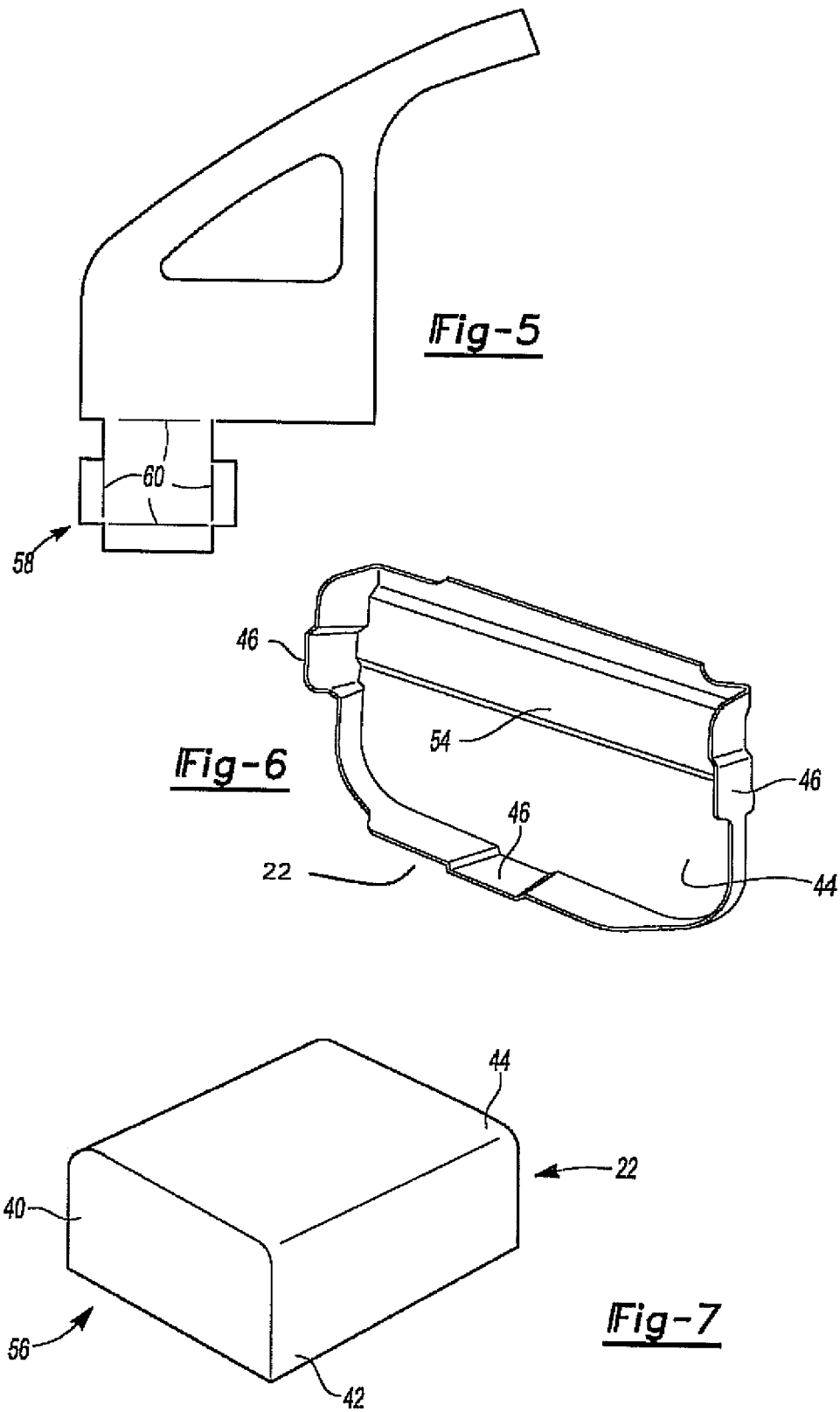

A-PILLAR FORCE TRANSFER STRUCTURE

BACKGROUND OF THE INVENTION

I. Field of the Invention

A load transferring structure for use in an A-pillar assembly in an automotive vehicle for transferring the force of a frontal impact to the vehicle rail, rocker, and door reinforcement.

II. Description of the Prior Art

An A-pillar assembly of an automotive vehicle provides structural support for the vehicle roof as well as other vehicle components, and also serves to transfer the load of a frontal impact to other vehicle structures. The A-pillar is generally disposed forward of the front passenger and driver doors.

A-pillar assemblies in automotive vehicles typically comprise an outer panel assembly and an inner panel assembly. The edges of the outer panel assembly are attached to the edges of the inner panel assembly, and a portion of the outer panel assembly is spaced apart from the inner panel assembly. The outer panel assembly can be further defined by an upper portion and a lower portion. The lower portion and upper portion of the outer panel assembly are both attached to the inner panel assembly such that part of the lower portion is inside the upper portion. Furthermore, the conventional construction of such outer panel assemblies has been to make the lower portion and upper portion generally the same width and profile as to increase the strength of the A-pillar assembly. However, such configurations use a lot of material which in turn increases the weight of the vehicle and cost of production. Accordingly, attempts have been made to reduce material while maintaining load transferring capabilities by utilizing a reinforcing structure.

U.S. Pat. No. 6,679,547 (Ju-Sik) discloses such a reinforcing structure for an A-pillar. The reinforcing structure is a bracket is fitted between the outer panel and the inner panel of an A-pillar assembly to provide structural support and load transfer capabilities. The bracket has a generally planar base with flanges extending outwardly from the base at an angle. WO2005/061309 (Anders et al.) discloses a reinforcement strut disposed over the A-pillar assembly and extending from the cowl to the door reinforcement The reinforcement structure in Ju-Sik tends to bend at the flanges when influenced by a frontal impact and therefore loses some load transferring characteristics, and the reinforcement strut disclosed in Anders et al. requires additional material to extend from the cowl to the door reinforcement. Therefore, it is desirable to have an A-pillar assembly which utilizes less material to retain an efficient load transferring capability.

SUMMARY OF THE INVENTION AND ADVANTAGES

An A-pillar assembly in an automotive vehicle having a structure for transferring the force of a frontal impact to other structural parts of the vehicle without using the amount of material previously required to achieve such a transfer. The A-pillar assembly has an inner panel assembly attached to an outer panel assembly. The inner panel assembly has a plurality of panels forming a generally planar surface and extends from the vehicle rail to the rocker of the vehicle. The outer panel assembly also extends from the rail of the vehicle towards the rocker of the vehicle, with a portion of the outer panel assembly being spaced apart from the inner panel assembly.

The outer panel assembly is further defined by an upper outer panel and a lower outer panel. The upper outer panel extends from the vehicle rail along the windshield towards the vehicle cowl. The lower outer panel may extend from the vehicle rocker to the vehicle cowl. The upper outer panel has a lower portion and the lower outer panel has an upper portion, the lower portion is disposed over the upper portion in an overlapping relationship.

A compartment exists within the A-pillar assembly where the lower portion is in an overlapping relationship with the upper portion. A load transfer structure is disposed in the compartment. The load transfer structure may be in contact with both the lower portion and the upper portion such that the force of a frontal impact does not result in a collapse of the A-pillar assembly; instead, force from the frontal impact may be efficiently transferred through the load transfer structure to the vehicle rail, rocker and door reinforcement. Thus, the load transfer structure eliminates the need for an upper portion of a lower outer panel to have the same width as a lower portion of an upper outer panel. Accordingly, the load transfer structure reduces material required in conventional A-pillar assemblies while maintaining the same load transfer capabilities.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is an embodiment of the load transfer structure where the load transfer structure is integrated into the upper outer panel.

FIG. 6 is another perspective of the load transferring structure having transverse embosses and a strengthening emboss.

FIG. 7 is an embodiment of the load transfer structure having a solid body.

DETAILED DESCRIPTION OF THE INVENTION

Figure 1:
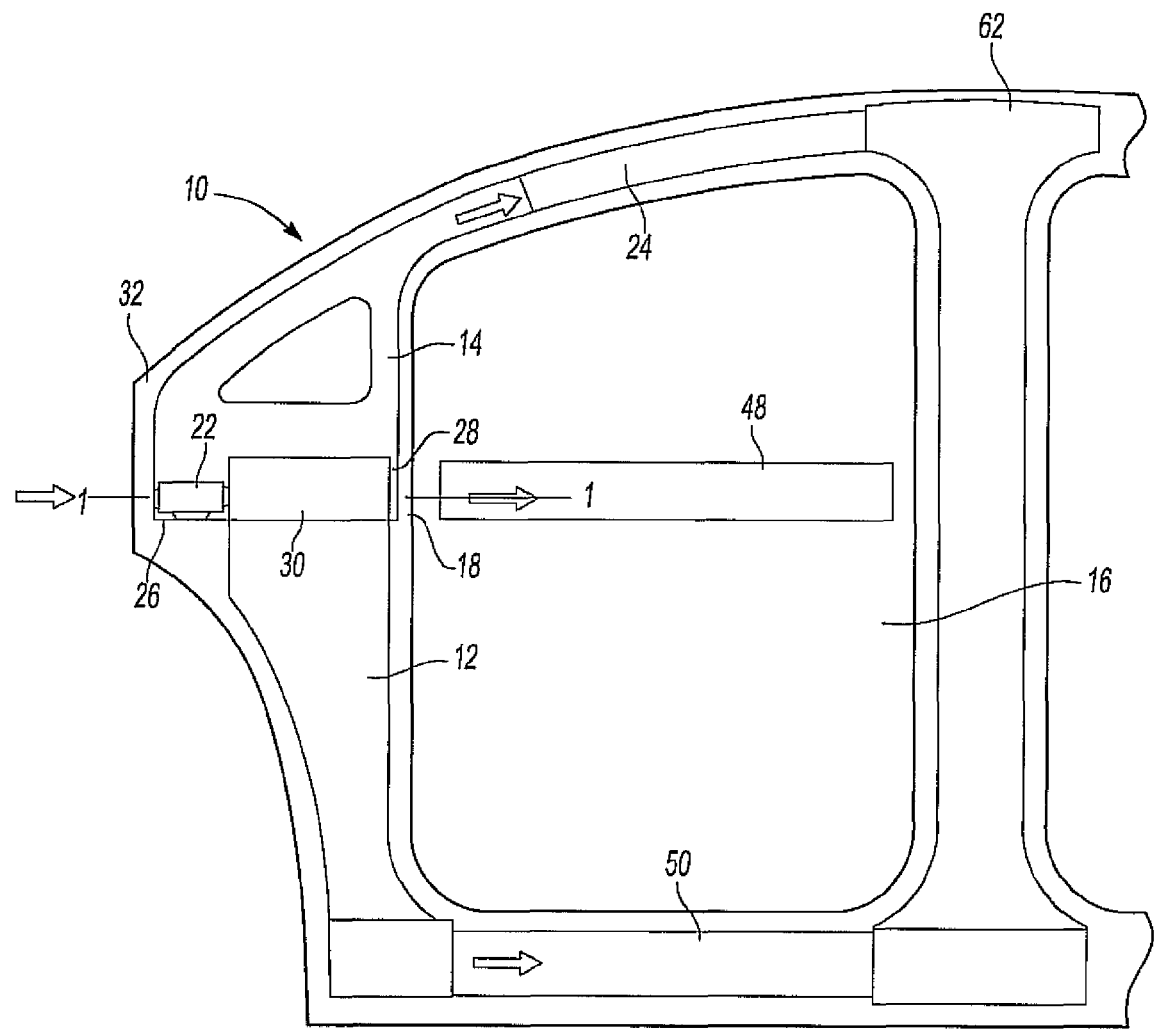
FIG. 1 is a perspective of an A-pillar assembly having a load transfer structure fitted inside the upper outer panel and adjacent to the lower outer panel.
Figure 2:
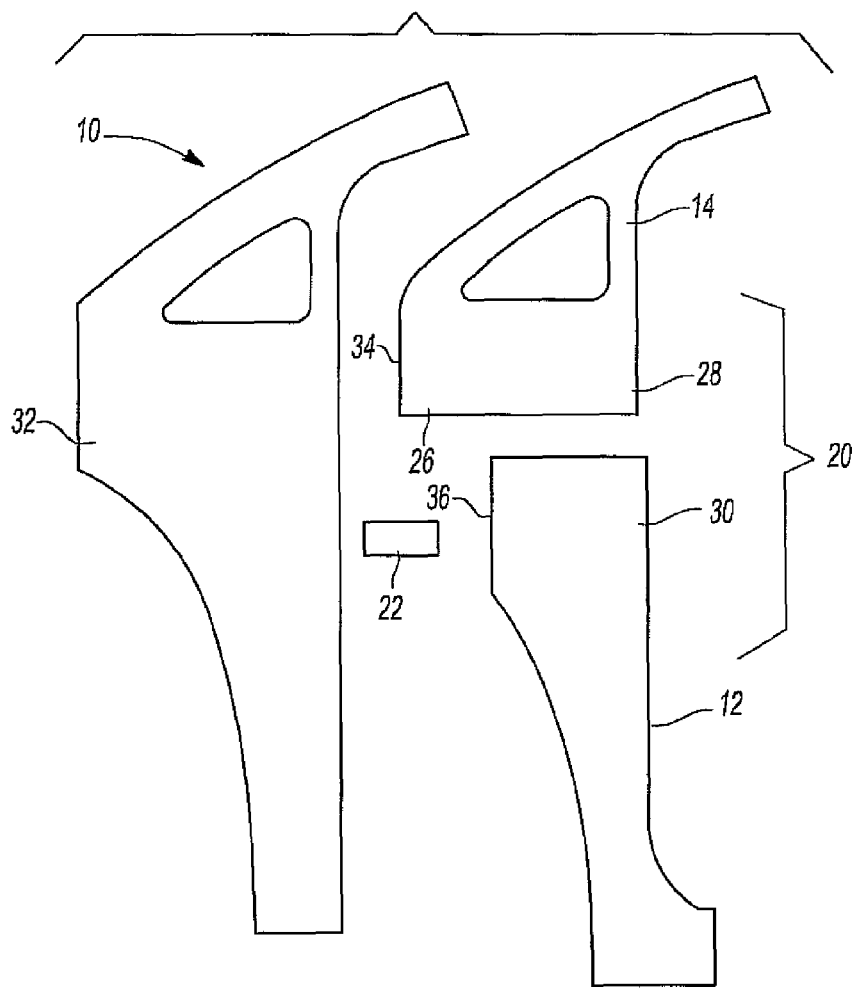
FIG. 2 is an exploded view of FIG. 1.

Referring to the Figures, wherein like numerals indicate corresponding parts throughout the several views, disclosed herein, is an A-pillar assembly 10 in an automotive vehicle having a structure for transferring the force of a frontal impact to other structural parts of the vehicle. The A-pillar assembly generally comprises a lower outer panel 12 with a width lesser than the width of an upper outer panel 14. The A-pillar assembly 10 is disposed adjacent to the front door openings 18 of a vehicle. The A-pillar assembly 10 has an inner panel assembly 32, attached to an outer panel assembly 20 and a load transfer structure 22 housed therebetween. The inner panel assembly 32 comprises a plurality of panels presenting a generally planar surface and extends from the vehicle rail 24 to the vehicle rocker 50. The outer panel assembly 20 has an upper outer panel 14, a lower outer panel 12, and an intermediate portion 26. The upper outer panel 14 extends from the vehicle rail 24 downwards along the windshield to the vehicle cowl and into a lower portion 28. The lower portion 28 extends down from the upper outer panel 14 to a terminal free end. The lower outer panel 12 extends from the rocker 50 of the vehicle to the cowl of the vehicle, and has an upper portion 30. The upper portion 30 extends upwardly from the lower outer panel 12 to a terminal free end.

Figure 3:
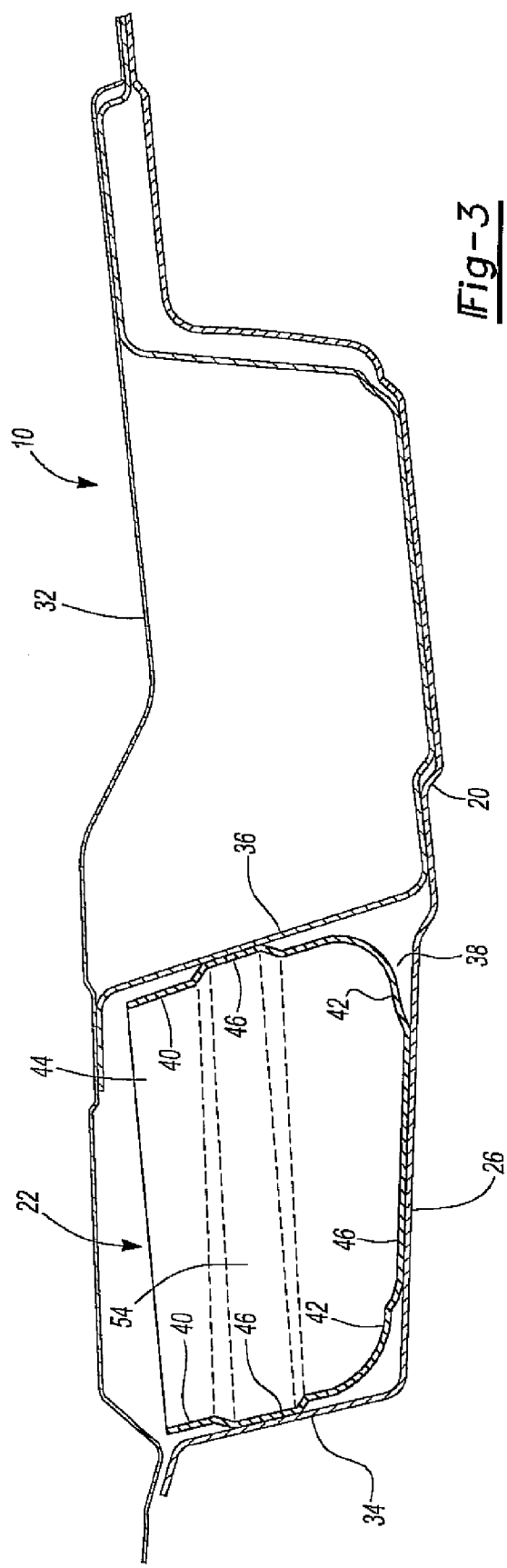
FIG. 3 is a cross-sectional view of FIG. 1 taken along lines 1-1.

The outer panel assembly 20 is welded to the inner panel assembly 32, with the intermediate portion 26 being spaced apart from the inner panel assembly 32 as seen in FIG. 3. The upper portion 30 is narrower than the lower portion 28, and is disposed inside and in an overlapping relationship with the lower portion 28 of the upper outer panel 14. Accordingly, a portion of the lower outer panel 12 is covered by the upper outer panel 14.

The lower portion 28 has a transverse lower wall 34. The transverse lower wall 34 extends from the distal edge of the lower portion 28 towards the inner panel assembly 32. The upper portion 30 has a transverse upper wall 36. The transverse upper wall 36 extends from the distal end of the upper portion 30 towards the inner panel assembly 32. The transverse upper wall 36 is spaced apart from and rearward of the transverse lower wall 34, with the intermediate portion 26 therebetween. Both the upper outer panel 14 and lower outer panel 12 are attached to the inner panel assembly 32, with the upper portion 30 being inside the lower portion 28. Thus, the upper portion 30 is narrower than the lower portion 28, and a compartment 38 is formed within the A-pillar assembly 10.

The compartment 38 is defined horizontally by the space between the transverse upper wall 36 and the transverse lower wall 34; vertically by the distance by which the upper portion 30 is disposed within the lower portion 28; and laterally by the distance between the inner panel assembly 32 and the intermediate portion 26.

A load transfer structure 22 is stamped from metal of similar material as the A-pillar assembly 10 and is disposed within the compartment 38 of the A-pillar assembly 10. The load transfer structure 22 has a pair of transverse walls 40 spaced apart and opposite each other, at least one longitudinal wall 42 extending between the pair of transverse walls 40; and at least one support wall 44. The longitudinal wall 42 is in contact with the intermediate portion 26 of the outer assembly. The support wall 44 extends between the pair of transverse walls 40, and extends from the longitudinal wall 42 towards the inner panel assembly 32. At least one transverse emboss 46 is disposed on the pair of transverse walls 40 and the longitudinal wall 42. The transverse embosses 46 extend transversely across the pair of transverse walls 40 and the longitudinal wall 42. These transverse embosses 46 are welded to the compartment 38 at the transverse lower wall 34, transverse upper wall 36, and intermediate portion 26.

The load transfer structure 22 is attached within the compartment 38 at the transverse embosses 46. Ideally, the transverse walls 40, support walls 44, and longitudinal walls 42 will be spot welded to the transverse member upper portion 30, transverse member lower portion 28, inner panel assembly 32, and intermediate portion 26, respectively. The load transfer structure 22 operates to transfer the load from a frontal impact to other vehicle structures such that the A-pillar assembly 10 does not collapse through section 1-1, and the distortion of the door opening 18 is minimized so as to interfere with the operation of the vehicle's front door 16 under a predetermined amount of force.

FIG. 1 shows how force from a frontal impact is distributed to the rail 24, door reinforcement 48, and rocker 50 of a vehicle having an A-pillar with the described load transfer structure 22. The transverse embosses 46 on the transverse walls 40 are designed to affect a point of contact between the load transfer structure 22 and the A-pillar assembly 10, thereby preventing the compartment 38 from collapsing. Accordingly, the number of transverse embosses 46 integrated onto the load transfer structure 22 depends upon number of contact points desired. Thus when the load transfer structure 22 is subjected to frontal impact, the transverse embosses 46 ensure that the load transfer structure 22 is in contact with the compartment 38 which in turn facilitates the transfer of load through the A-pillar assembly 10 along path shown by the arrows 52. Such a load transfer helps mitigate the risk of the A-pillar assembly 10 collapsing through section 1-1 or deforming and distorting the shape of the door opening 18. This in turn increases the likelihood of the driver and passenger front door 16 being able to swing open after a frontal impact. The use of the load transfer structure 22 provides for an A-pillar assembly 10 with conventional load transferring capabilities while reducing the material required for conventional A-pillar assemblies 10.

Figure 4:
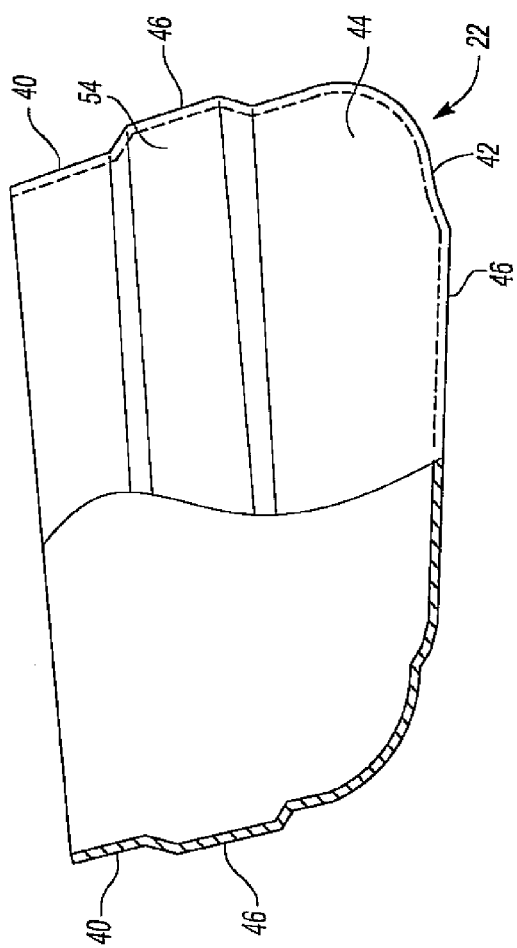
FIG. 4 is an embodiment of the load transfer structure having a strengthening emboss and transverse embosses.

FIGS. 4, 5, and 6 show different embodiments of the load transfer structure 22. FIG. 4 shows an embodiment where the load transfer structure 22 has a strengthening emboss 54 extending along the length of the support wall 44. The strengthening emboss 54 provides strength to the load transfer structure 22 and helps the load transfer structure 22 from deforming due to a frontal impact. Accordingly, the load transfer structure 22 may be fitted with a plurality of strengthening embosses 54 depending upon the amount of longitudinal rigidity desired. FIG. 7 shows an embodiment where the load transfer structure 22 has a solid body 56. The load transfer structure 22 can be a separate piece or integrated into the upper outer panel 14. FIG. 5 shows an embodiment of the load transfer structure 22 where the load transfer structure 22 is a folded portion 58 integrated into the lower portion 28. The folded portion 58 being generally planar has folding lines 60. The folding lines 60 define the transverse walls 40, longitudinal walls 42, and support wall 44 of the box. Accordingly, the folded portion 58 can be folded into the load transfer structure 22 and fitted within the compartment 38.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A load transfer structure for an A-pillar assembly of a vehicle for transferring load of a frontal impact to the rail, door reinforcement, and rocker of the vehicle, in an A-pillar assembly having a transverse upper wall having an intermediate portion, the transverse upper wall being spaced apart and opposite a transverse lower wall, and enclosing a space, the load transfer structure disposed within said space, the load transfer structure comprising:

a support wall;

a pair of transverse walls spaced apart and opposite each other, the pair of transverse walls extending outwardly from the support wall;

a longitudinal wall, the longitudinal wall extending outwardly from the support wall and between the pair of transverse walls; and wherein one of the pair of transverse walls being in contact with the transverse upper wall, and the other of the pair of transverse walls being in contact with the transverse lower wall, and the longitudinal wall being in contact with the intermediate portion such that the force of a frontal impact is transferred through the load transfer structure to the rail, door reinforcement, and rocker of the vehicle thereby reducing the amount of material used in an A-pillar assembly while maintaining the A-pillar assembly's load transferring capabilities.

2. An A-pillar assembly as set forth in claim 1 wherein the load transfer structure having a plurality of folding lines, the folding lines defining the pair of transverse walls, the longitudinal wall, and the support wall.

3. An A-pillar assembly as set forth in claim 1 wherein the load transfer structure has a solid body.

4. An A-Pillar assembly as set forth in claim 1 wherein the load transfer structure further comprising a strengthening emboss disposed on the surface of the support wall, the strengthening emboss extending between the pair of transverse walls.

5. An A-Pillar assembly as set forth in claim 1 wherein the load transfer structure further comprising a plurality of transverse embosses, the plurality of transverse embosses extending transversely across each of the pair of transverse walls and the longitudinal walls.

6. A load transfer structure for an A-pillar assembly of a vehicle for transferring load of a frontal impact to the rail, door reinforcement, and rocker of the vehicle, in an A-pillar assembly having a transverse upper wall having an intermediate portion, the transverse upper wall being spaced apart and opposite a transverse lower wall, and enclosing a space, the load transfer structure disposed within said space, the load transfer structure comprising:

a support wall;

a pair of transverse walls spaced apart and opposite each other, the pair of transverse walls extending outwardly from the support wall;

a longitudinal wall, the longitudinal wall extending outwardly from the support wall and between the pair of transverse walls;

a strengthening emboss disposed on the surface of the support wall and extending between the pair of transverse walls;

a plurality of transverse embosses, the transverse embosses extending transversely across each of the pair of transverse walls, and the longitudinal wall; and wherein one of the pair of transverse walls being in contact with the transverse upper wall, and the other of the pair of transverse walls being in contact with the transverse lower wall, and the longitudinal wall being in contact with the intermediate portion such that the force of a frontal impact is transferred through the load transfer structure to the rail, door reinforcement, and rocker of the vehicle thereby reducing the amount of material used in an A-pillar assembly while maintaining the A-pillar assembly's load transferring.

* * * * *